Patented July 12, 1949

2,476,260

UNITED STATES PATENT OFFICE 2,476,260

PROCESS FOR THE MANUFACTURE OF DISAZO-DYESTUFFS

Hans Mayer, Basel, and Willy Widmer, Bottmingen, Switzerland, assignors to Ciba Limited, Basel, Switzerland, a Swiss firm No Drawing. Application March 19, 1947, Serial No. 735,789. In Switzerland April 11, 1946

5 Claims. (Cl. 260—182)

According to this invention valuable disazo-dyestuffs free from sulfonic acid groups are made by coupling tetrazotized 3:3'-dihydroxy-4:4'-diaminodiphenyl with an hydroxynaphthalene capable of coupling in a position vicinal to a hydroxyl group in the presence of a considerable quantity of pyridine.

In accordance with the invention there may be produced, for example, asymmetrical disazo-dyestuffs free from sulfonic acid groups by coupling 1 molecular proportion of tetrazotized 3:3'-dihydroxy-4:4'-diaminodiphenyl with 1 molecular proportion each of two different hydroxy-naphthalenes capable of coupling in a position vicinal to a hydroxyl group.

The process is, however, especially suitable for the manufacture of symmetrical disazo-dyestuffs from 1 molecular proportion of tetrazotized 3:3'-dihydroxy-4:4'-diaminodiphenyl and 2 molecular proportions of an hydroxynaphthalene capable of coupling in a position vicinal to a hydroxyl group.

Among the hydroxynaphthalenes capable of coupling in a position vicinal to a hydroxyl group and used as starting materials in the invention there may be mentioned, for example, 2-hydroxy-naphthalene or hydroxy-methoxy-naphthalenes such as 2-hydroxy-6-methoxynaphthalene. Especially valuable results can be obtained with those hydroxynaphthalenes capable of coupling in a position vicinal to a hydroxyl group which, in addition to such hydroxyl group, contain as the sole further substituent a second hydroxyl group, an hydroxy-alkoxy group such, for example, as an —O—CH$_2$—CH$_2$OH or

—O—CH$_2$—CHOH—CH$_2$OH group, an —NH$_2$ group or, especially, an —SO$_2$NH$_2$ group. As examples of such compounds there may be mentioned: 1:5-, 1:8-, 2:3-, 2:4-, 2:5-, 2:6-, 2:7- or 2:8-dihydroxynaphthalene, 2:6- or 2:7-dihydroxynaphthalene monoglycol ether, 2:6- or 2:7-dihydroxynaphthalene monoglycerine ether, 2:6- or 2:7-amino-hydroxynaphthalene, 1:4-, 1:5-, 1:8-, 2:6- or 2:7-hydroxynaphthalene-sulfonamide.

The tetrazotization of the 3:3'-dihydroxy-4:4'-diaminodiphenyl used as starting material may be carried out in the usual manner, for example, by means of hydrochloric acid and sodium nitrite. As a rule it is of advantage first to neutralize the suspension of the tetrazo-compound, then to separate the latter compound, and to couple it, for example, in the form of a filter cake, with the coupling component dissolved in pyridine. The coupling is carried out in the presence of a considerable quantity of pyridine, that is to say the coupling mixture should contain more than 25 per cent. of pyridine. The alkali which is generally also necessary for the coupling is then advantageously slowly run in the form of a concentrated aqueous solution. As alkalies there may be used, for example, the usual carbonates or hydroxides of alkali metals, the solubility of the alkali being taken into consideration, if required. The temperature at which coupling is carried out is advantageously kept low, especially at the outset of the reaction.

The coupling mixture is worked up in the usual manner, for example, by removing the solvent by distillation and concentrating by evaporation, or by dilution, if desired, after lowering the pH value by the addition of acid, and salting out.

The disazo-dyestuffs obtainable by this invention are suitable for dyeing various materials, especially cellulose fibers such as linen, cotton and artificial silk or staple fibers of regenerated cellulose. They can be converted in substance, in the dyebath or on the fiber into complex metal compounds, for example, copper, chromium, iron, nickel or cobalt compounds. The conversion into such complex metal compounds, which may contain a plurality of metals in the complex, is carried out by known methods in an acid, neutral or alkaline solution, with or without suitable additions, such as salts of inorganic or organic acids, salts of acids forming complexes such as tartaric acid or amino-acetic acid, and in the presence or absence of a diluent or suspension medium, such as pyridine or glycerine, and under atmospheric or superatmospheric pressure. Many of the complex metal compounds produced in substance, especially cobalt or copper compounds or cobalt-copper compounds, can be used for coloring masses or solutions thereof, such as nitrocellulose lacquers, artificial resins or spinning masses.

The disazo-dyestuffs obtained by the invention may be treated advantageously on the fiber or in the dyebath or in part on the fiber and in part in the dyebath by known methods with agents yielding metal. It is of advantage, however, to use the process described in U. S. Patent No. 2,148,659, in which the material is first dyed and then treated in the same bath with an agent yielding metal. As agents yielding metal there come into consideration in this connection, preferably, those which are stable towards alkaline solutions, such as complex copper tartrates and the like.

There have already been described (see, for example, U. S. Patent No. 2,427,537 and U. S. patent applications Ser. No. 498,884, now Patent No.

2,426,977, and Ser. No. 498,885, now Patent No. 2,439,153) processes for the manufacture of azo-dyestuffs from tetrazotized 3:3'-dihydroxy-4:4'-diaminodiphenyl. The coupling reactions are, however, in all cases carried out in aqueous solution or suspension, and where an addition of pyridine is used the quantity thereof is very small so that it cannot be said to be a considerable quantity. On the other hand, by the process of the present invention in which pyridine is present in a relatively large quantity and in high concentration, that is to say, such that the solution has a content of more than 25 per cent of pyridine and the greater part of the coupling component is dissolved in the pyridine, important advantages are obtained in that, for example, purer dyestuffs can be produced and/or better yields obtained.

The following examples illustrate the invention, the parts being by weight:

Example 1

21.6 parts of 3:3'-dihydroxy-4:4'-diaminodiphenyl are tetrazotized in the usual manner. The tetrazo-compound is neutralized, filtered and introduced into a solution of 33 parts of 2:6-dihydroxynaphthalene in 150 parts of pyridine. A solution of 30 parts of potassium carbonate in 80 parts of water is introduced dropwise in the course of ½ hour, the temperature being kept below 10° C. The whole is then stirred for a short time until dyestuff formation is complete. The dyestuff may be worked up in any desired manner, for example, by diluting the mixture with water, or by removing the pyridine by distillation, or by acidification. After being separated by filtration, washed and dried the dyestuff is a dark blue powder, which dissolves in dilute caustic soda solution with a greenish blue coloration and dyes cellulose fibers by the single bath or two-bath after-coppering process navy blue tints which are fast to washing and light.

Example 2

The tetrazo-compound obtained in the usual manner from 21.6 parts of 3:3'-dihydroxy-4:4'-diaminodiphenyl is separated and introduced into a solution of 46 parts of 2-hydroxynaphthalene-6-sulfonamide in 220 parts of pyridine. 50 parts of a caustic potash solution of 25 per cent strength are then added dropwise at 5–10° C. in the course of 2 hours, the temperature is raised slowly to 20° C., and the whole is stirred until coupling is complete. The mixture is diluted with water, the pyridine is removed by distillation under reduced pressure, the precipitated dyestuff is separated by filtration, washed until neutral, and dried under reduced pressure. The dyestuff dissolves with a violet coloration in water, with a blue coloration in caustic soda solution, and dyes cellulose fibers by the single bath or two-bath after-coppering process blue-violet tints which are fast to washing and light.

By using, instead of 2-hydroxynaphthalene-6-sulfonamide, the 2:7-, 2:5-, 1:4-, 1:5- or 1:8-isomer a similar dyestuff is obtained.

Example 3

The tetrazo-compound obtained in the usual manner from 21.6 parts of 3:3'-dihydroxy-4:4'-diaminodiphenyl is separated and introduced into a solution of 33 parts of 2:7-dihydroxynaphthalene in 100 parts of pyridine. The whole is cooled to 5° C. A solution of 30 parts of potassium carbonate in 80 parts of water is introduced dropwise in the course of ½ hour, and the whole is stirred at room temperature to complete the coupling. The dyestuff, which is precipitated by dilution with water, is separated by filtration and washed. By drying it under reduced pressure a blue-black powder is obtained, which dissolves in a dilute caustic soda solution with a blue coloration and dyes cellulose fibers by the single or two-bath after-coppering process reddish navy blue tints which are fast to washing and light.

By using, instead of 2:7-dihydroxynaphthalene, a mixture of equal parts of 2:6- and 2:7-dihydroxynaphthalene a dyestuff is obtained which dyes cellulose fibers somewhat bluer shades.

By using 2:4-dihydroxynaphthalene, instead of 2:7-dihydroxynaphthalene a similar product is obtained.

Example 4

21.6 parts of 3:3'-dihydroxy-4:4'-diaminodiphenyl are tetrazotized in the usual manner. The tetrazo-compound is neutralized, separated by filtration, and introduced into a solution, cooled to 2° C., of 33 parts of 2:6-dihydroxynaphthalene in a mixture of 100 parts of pyridine and 70 parts of water. 13.3 parts of a caustic soda solution of 30 per cent strength are introduced dropwise in the course of ½ hour to 1 hour, the temperature being kept below 10° C. After stirring for several hours coupling ceases. The dyestuff is separated in a suitable manner and dried under reduced pressure. The dyestuff has the same properties as that described in Example 1.

Example 5

The tetrazo-compound obtained from 21.6 parts of 3:3'-dihydroxy-4:4'-diaminodiphenyl is introduced into a solution of 33 parts of 2:6-dihydroxynaphthalene in 100 parts of pyridine and 50 parts of water. The whole is cooled to 2° C. and 25 parts of anhydrous sodium carbonate are slowly strewn in. By stirring for several hour at 2–15° C. coupling is completed. The mixture is diluted with 500 parts of water, the pyridine is removed by distillation, and the precipitated dyestuff is separated by filtration and washed neutral. By drying it a product is obtained which has the same properties as those of the product of Example 1.

Example 6

The tetrazo-compound obtained in the usual manner from 21.6 parts of 3:3'-dihydroxy-4:4'-diaminodiphenyl is separated and introduced at 0–5° C. into a solution of 33 parts of 1:5'-dihydroxynaphthalene in 150 parts of pyridine and 36 parts of caustic alkali. The whole is stirred for a few hours at 5–15° C. and the dyestuff formed is separated in the usual manner. By drying it a violet-black powder is obtained, which dissolves in dilute caustic soda solution with a pure blue coloration and dyes cellulose fibers by the single bath or two-bath after-coppering process black tints which are fast to washing and light.

By using, instead of 1:5-dihydroxynaphthalene, 2:3'-dihydroxynaphthalene, for example, a product is obtained which dyes cellulose fibers reddish navy blue tints. With 2-hydroxy-6-hydroxyethoxynaphthalene a product is obtained which yields greenish navy blue tints.

Example 7

The tetrazo-compound obtained in the usual manner from 21.6 parts of 3:3'-dihydroxy-4:4'-diaminodiphenyl is separated and introduced at 0-5° C. into a solution of 34 parts of 2-amino-7-hydroxynaphthalene in 300 parts of pyridine. 40 parts of a caustic soda solution of 30 per cent. strength are then introduced dropwise in the course of one hour, and the whole is stirred at room temperature until coupling is complete. By working up in the usual manner a black-blue powder is obtained, which dyes cellulose fibers from an alkaline bath by the single or two-bath after-coppering process navy blue tints.

*Example 8*

100 parts of cotton are entered at 40° C. into a dye-bath which contains 0.6 part of the dyestuff obtained as described in the first paragraph of Example 2 and 3 parts of sodium carbonate in 3000 parts of water, and the temperature is raised to 90-95° C. for ¾ hour. The dyebath is then cooled to 80° C., the necessary quantity of a complex copper tartrate solution rendered weakly alkaline with sodium carbonate is added, and the cotton is treated for about ½ hour at 80-90° C. It is then thoroughly rinsed and, if desired, soaped for a short time. The cotton is dyed a fast violet tint.

What we claim is:

1. Process for the manufacture of a disazo dyestuff which comprises coupling 1 molecular proportion of tetrazotized 3:3'-dihydroxy-4:4'-diaminodiphenyl with 2 molecular proportions of a hydroxynaphthalene capable of coupling in a position vicinal to a hydroxyl group and containing in addition to the hydroxyl group as the sole further substituent a substituent selected from the group consisting of a second hydroxyl group and an —SO$_2$NH$_2$— group, in the presence of more than 25 per cent. of pyridine in the coupling mixture.

2. Process for the manufacture of a disazo-dyestuff which comprises coupling 1 molecular proportion of tetrazotized 3:3'-dihydroxy-4:4'-diaminodiphenyl with 2 molecular proportions of a hydroxynaphthalene capable of coupling in a position vicinal to the hydroxyl group and containing in addition to the hydroxyl group as the sole further substituent an —SO$_2$NH$_2$ group, in the presence of more than 25 per cent. of pyridine in the coupling mixture.

3. Process for the manufacture of a disazo-dyestuff which comprises coupling 1 molecular proportion of tetrazotized 3:3'-dihydroxy-4:4'-diaminodiphenyl with 2 molecular proportions of 2-hydroxynaphthalene - 6 - sulfonamide, in the presence of more than 25 per cent. of pyridine in the coupling mixture.

4. Process for the manufacture of a disazo-dyestuff which comprises coupling 1 molecular proportion of tetrazotized 3:3'-dihydroxy-4:4'-diaminodiphenyl with 2 molecular proportions of 1-hydroxynaphthalene - 4 - sulfonamide, in the presence of more than 25 per cent. of pyridine in the coupling mixture.

5. Process for the manufacture of a disazo-dyestuff which comprises coupling 1 molecular proportion of tetrazotized 3:3'-dihydroxy-4:4'-diaminodiphenyl with 2 molecular proportions of 2:6-dihydroxynaphthalene, in the presence of more than 25 per cent. of pyridine in the coupling mixture.

HANS MAYER.
WILLY WIDMER.

REFERENCES CITED

The following references are of record in the file of this patent:

UNITED STATES PATENTS

| Number | Name | Date |
| --- | --- | --- |
| 1,210,751 | Anderwert et al. | Jan. 2, 1917 |
| 1,292,385 | Anderwert et al. | Jan. 21, 1919 |
| 2,424,006 | Straub et al. | July 15, 1947 |
| 2,426,977 | Straub et al. | Sept. 9, 1947 |
| 2,427,537 | Straub et al. | Sept. 16, 1947 |

FOREIGN PATENTS

| Number | Country | Date |
| --- | --- | --- |
| 102,881 | Great Britain | June 4, 1917 |
| 248,230 | Great Britain | Mar. 4, 1926 |
| 287,232 | Great Britain | Mar. 16, 1928 |
| 347,742 | Great Britain | Apr. 30, 1931 |
| 410,192 | Great Britain | May 14, 1934 |
| 232,506 | Switzerland | Aug. 16, 1944 |
| 232,507 | Switzerland | Aug. 16, 1944 |
| 232,508 | Switzerland | Aug. 16, 1944 |
| 232,509 | Switzerland | Aug. 16, 1944 |
| 232,510 | Switzerland | Aug. 16, 1944 |
| 650,688 | France | Sept. 25, 1928 |
| 298,518 | Great Britain | Oct. 8, 1928 |